(12) United States Patent
Zamora Rea et al.

(10) Patent No.: US 11,999,663 B2
(45) Date of Patent: Jun. 4, 2024

(54) LIQUID ORGANIC NUTRIENT FOR AGRICULTURAL USE AND PRODUCTION METHOD THEREOF

(71) Applicant: TECNICA MINERAL S.A. DE C.V., Tlaquepaque (MX)

(72) Inventors: Francisco Zamora Rea, Guadalajara (MX); Jose Luis Santos Salazar, Tlaquepaque (MX)

( * ) Notice: Subject to any disclaimer, the term of this patent is extended or adjusted under 35 U.S.C. 154(b) by 955 days.

(21) Appl. No.: 16/964,261

(22) PCT Filed: Feb. 14, 2018

(86) PCT No.: PCT/MX2018/000013
§ 371 (c)(1),
(2) Date: Jul. 23, 2020

(87) PCT Pub. No.: WO2019/147115
PCT Pub. Date: Aug. 1, 2019

(65) Prior Publication Data
US 2021/0040004 A1 Feb. 11, 2021

(30) Foreign Application Priority Data
Jan. 25, 2018 (MX) .............................. 2018/001078

(51) Int. Cl.
*C05C 11/00* (2006.01)
*C01B 33/40* (2006.01)
(Continued)

(52) U.S. Cl.
CPC ............. *C05C 11/00* (2013.01); *C01B 33/40* (2013.01); *C05D 3/02* (2013.01); *G01N 5/045* (2013.01);
(Continued)

(58) Field of Classification Search
None
See application file for complete search history.

(56) References Cited

U.S. PATENT DOCUMENTS 11,390,570 B1 * 7/2022 Merritt ..................... C05D 1/02
2002/0174697 A1 11/2002 Reid et al.

FOREIGN PATENT DOCUMENTS

| CN | 102503683 A | 6/2012 |
| CN | 103113157 A | 5/2013 |

(Continued)

OTHER PUBLICATIONS

Gómez-Cruz, M. A., et al. "Agricultura, Apicultura y Ganaderia Orgánica en México (Situación-Retos-Tendencias)." Conacyt, Sagarpa, Cedrssa, UACh, Ciestaam, Pias. Texcoco (2005).

*Primary Examiner* — Wayne A Langel
(74) *Attorney, Agent, or Firm* — Feeney IP Law; Alan F. Feeney

(57) ABSTRACT

Liquid organic nutrient for agricultural use which comprises calcium carbonate, of which the particles have an average size of less than 1 micron, at least one humic substance to provide nutrients N-P-K (1-0-19), hydroxiphyllosilicate of aluminum and magnesium (HPAM) with a high gelling capacity, and water which is used as a diluent.

Method of producing the liquid organic nutrient for agricultural use, which comprises mixing at least one humic substance with water, adding calcium carbonate, grinding the mixture in a vertical pearl mill using a batch system for a sufficient time for the particles to have an average size of less than 1 micron, adjusting the percentage of solids to the initial value indicated in the nutrient formula, adding a quantity of hydroxiphyllosilicate of aluminum and magnesium, and recovering the particles of less than 1 micron from the product.

15 Claims, 1 Drawing Sheet

(51) Int. Cl.
*C05D 3/02* (2006.01)
*G01N 5/04* (2006.01)
*G01N 9/02* (2006.01)

(52) U.S. Cl.
CPC ......... *G01N 9/02* (2013.01); *G01N 2009/022* (2013.01)

(56) References Cited

FOREIGN PATENT DOCUMENTS

| | | | | |
|---|---|---|---|---|
| CN | 106083464 A | | 11/2016 | |
| CN | 106396867 A | | 2/2017 | |
| GB | 2431153 A | * | 4/2007 | ............... C05G 3/00 |
| WO | WO-2010001184 A1 | | 1/2010 | |
| WO | WO-2015082187 A1 | | 6/2015 | |

* cited by examiner

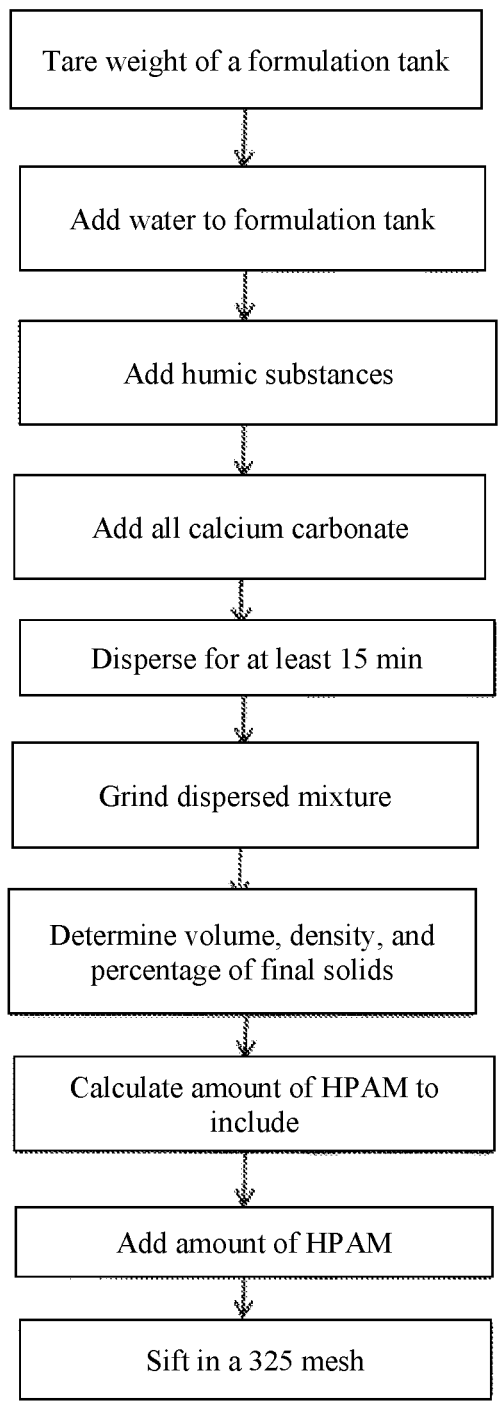

LIQUID ORGANIC NUTRIENT FOR AGRICULTURAL USE AND PRODUCTION METHOD THEREOF

CROSS-REFERENCE TO RELATED APPLICATIONS

This application is a continuation under 35 U.S.C. § 371 of International Application No. PCT/MX2018/000013 filed on Feb. 14, 2018 which claims priority to Mexican National Application No. MX/a/2018/001078 filed on Jan. 25, 2018, the entire contents of which is incorporated herein by reference.

TECHNICAL FIELD OF THE INVENTION

The present invention relates to the technical fields of organic chemistry and organic agriculture, providing a liquid organic nutrient for agricultural use, a method for producing said agricultural nutrient and methods of applying the agricultural nutrient.

BACKGROUND OF THE INVENTION

It is now well known that soil acidity is a very widespread limiting factor; in Mexico, for example, it represents 14% of the national territory under cultivation. It is also known that soil acidity is caused by different factors including the presence and decomposition of organic matter, the application of nitrogen fertilizers and acid rain, not to mention that the presence of acid soil increases the risk of pollution by aluminum (Al), iron (Fe) or manganese (Mg) owing to the greater availability thereof to crops. In addition, an acid soil indirectly affects crops as nutrients such as phosphorus (P), potassium (K), zinc (Zn), etc. are less available.

Products have been developed to counter the problems of soil acidity and/or salinization, such as patent document CN106396867 (A), which describes a slow-release fertilizer of humic acid suitable for the long-term improvement of soil salinization The fertilizer comprises, by weight, 120-180 parts of crop residues, 250-400 parts of humic acid, 160-200 parts of urea, 120-160 parts of nanometric calcium carbonate, 80-120 parts of mineral waste, 30-60 parts of high-viscosity attapulgite clay powder, 8-20 parts of *Azotobacter chroococcum,* 800-1200 parts of binder and 10-14 parts of microbial fermentation agent. The above-mentioned scientific formula for the slow-release humic acid fertilizer is suitable for the long-term improvement of saline soils, as it has a slow-release fertilizer effect, retains water, and provides the necessary nutritional components for plant growth.

Patent CN106083464 relates to a composite organic fertilizer and production technology thereof, and relates to the field of organic fertilizers. The composite organic fertilizer contains, by weight, 5-10 parts of lignin, 8-9 parts of diatomite, 5-7 parts of attapulgite, 13-17 parts of humic acid, 10-13 parts of calcium bentonite, 6-8 or 7-10 parts of nitrogen fertilizer, 7-9 parts of potassium fertilizer, 5-8 parts of calcium carbonate, 0.5-1 part of trace elements and 10-15 parts of water. The trace element contains, by weight, 2 parts of agricultural rare earth, 0.5 parts of borax, 0.5 parts of copper sulfate, 0.5 parts of manganese sulfate and 1 part of zinc sulfate heptahydrate. The technical plan provides an effective solution to the problem of crop eutrophy or nutrient deficiency symptoms, effectively prevents the problem of water pollution caused by fertilizer runoff, improves the soil, conserves resources and reduces costs.

Patent CN102503683 (A) for its part describes an effective biological organic fertilizer and preparation method thereof. The preparation method comprises principally the following steps: mixing an organic substance, urea, humic acid, ammonium sulfate, potassium chloride, straw ash, attapulgite, nano calcium carbonate powder and trace element fertilizer in determined parts by weight, and fermentation. The biological organic fertilizer obtained can effectively provide crops with host disease resistance/drought resistance, has high crop absorption, and may efficiently alleviate soil damage.

As can be seen, although new products have been proposed to improve agricultural soils, these products (fertilizers and manures) are very complex as they contain a larger number of ingredients, compared with the liquid organic nutrient formulation of the invention. For example, said conventional products contain nitrogenous fertilizers, potassium, live microorganisms, lignins, plant residues, etc. The methods for producing known fertilizers and manures are therefore more complex as they comprise a greater number of steps, such as fermentation, etc.

Given the above-mentioned drawbacks, a formulation was developed for a liquid organic nutrient for agricultural use which with few ingredients achieves the effects of improving agricultural soil with pH problems and also serves as a nutrient for any living organism that may feed on it, such as organisms of the Plantae and Fungi kingdoms. Also developed were a production method for the liquid organic nutrient, a soil correction method and a method of feeding a living organism using the liquid organic nutrient of the present invention.

The features contributed by the present invention are clearly shown in the following detailed description, accompanying drawings and examples, which have the sole object of illustrating some preferred embodiments of the present invention, and should therefore in no case be considered to limit the scope of protection of the present invention, in which:

FIG. 1 is a flow diagram of a production method of the liquid organic nutrient for agricultural use according to the present invention.

DETAILED DESCRIPTION OF THE INVENTION

Firstly, the present invention relates to a liquid organic nutrient for agricultural use which has a high content of solids having an average particle size of less than 1 micron, in which said organic nutrient may be used as a soil improver and as a feed for any living organism that could feed thereon, such as, preferably, organisms of the Plantae and Fungi kingdoms.

One of the important ingredients of the liquid organic nutrient according to the present invention is calcium carbonate with a purity of >99%, which thus meets the organic certification requirements of the Organic Materials Review Institute (OMRI). This organic nutrient is not only easier to use technically as it is presented in liquid form, but also, in order to comply with OMRI requirements, includes an amount of humic substances in its formulation which complement the pH stabilizing or corrective effect of calcium carbonate in the soil, with a biostimulant effect on crops characteristic of humic substances.

It is said of calcium carbonate that although it has less total relative neutralizing power (TRNP) than other agricultural products, such as quicklime (CaO) and calcium hydroxide ($Ca(OH)_2$), the difficulty of handling said products means that calcium carbonate is the material most widely used for liming at present, being also abundant and inexpensive.

It can also be said that this organic nutrient is contributing to the growth the organic agriculture sector has and will continue to experience in Mexico and the world. As evidence of this, it can be said that this sector has seen annual growth of 33% as shown by the Mexican Centre for Economic, Social and Technological Research into Agroindustry and World Agriculture (CIESTAAM) in its publication "Organic Agriculture, Beekeeping and Livestock Raising in Mexico (2005)", in a study carried out between 1996 and 2005. In Mexico in 2005, this sector represents an area of almost 300,000 ha, worked by 80,000 growers and produces 267 million dollars of foreign currency, putting it in $18^{th}$ place in the world. The main products cultivated in Mexico include coffee, with 70,838 ha in 2000 representing 68.9% of the total organic area under cultivation and a total of 47,461.5 tons positioning the country as the leading organic producer of this crop. It is followed by blue and white maize with 4670.5 ha representing 4.5% of total organic area and a total of 7,800.0 tons, and vegetables with 3,831 ha which represents 3.7% of total organic area and a total of 55,288.4 tons.

85% of the Mexican organic production is destined for export, while the remaining 15% is sold on the domestic market, particularly as a conventional product since there is still no domestic demand for these products. The export destinations include the United States, Germany, the Netherlands, Japan, the United Kingdom and Switzerland. For the above reasons, this product is a valuable option for Mexican organic growers as OMRI certification is widely recognized around the world.

Said liquid organic nutrient for agricultural use according to the present invention comprises calcium carbonate, of which the particles have an average size of less than 1 micron, having a relative neutralizing power of 100%. The function of the calcium carbonate is to raise soil pH and add calcium (Ca) to the soil, and to act as a nutrient for living organisms that are able to feed on said organic nutrient, such as plants, fungi, etc.

In one embodiment of the nutrient according to the present invention, the calcium carbonate has a purity of >99%.

In a further embodiment of the nutrient according to the present invention, the calcium carbonate is present in a quantity of no less than 65% relative to the total volume of the agricultural nutrient.

The liquid organic nutrient in question has at least one humic substance to provide nutrients N-P-K (1-0-19), is a natural crop biostimulant, improves the cation exchange capacity of the soil, increases nutrient availability to crops, stimulates root development in vegetables and serves as a dispersant for grinding in the production process of said liquid organic nutrient.

In a preferred embodiment of the organic nutrient according to the present invention, the humic substance may be humic acids, fulvic acids and/or a combination thereof.

In a further embodiment of the organic nutrient according to the present invention, the humic substance has a purity of more than 90% and is present in a quantity from 1% to 5%.

The nutrient according to the present invention has attapulgite (hydroxiphyllosilicate of aluminum and magnesium (HPAM)) with a high gelling capacity and a relative neutralizing power of 30%, its function being to act as a phase stabilizer and thickener.

In one embodiment of the present invention, the attapulgite is present in a quantity of 0.1% to 0.5% relative to the total volume of the agricultural nutrient in question.

Said nutrient should have a diluent so that all the ingredients that make up the nutrient in question are dispersed, dissolved, mixed, etc. The diluent may be water. Preferably, the water is treated by a filtration, UV lamps and chlorination system so as to be free from impurities.

There is no OMRI-certified, calcium-carbonate-based product in liquid form on the organic agriculture market that performs the function of raising soil pH while at the same time, as already mentioned, owing to its formulation, providing the biostimulant and corrective benefits of humic substances.

A further object of the present invention is a method of producing the liquid organic nutrient for agricultural use according to the present invention wherein said method comprises the step of mixing at least one humic substance with water, stirring at 1300 rpm for a sufficient time to achieve complete incorporation, homogenization and humectation, wherein the sufficient time may be 10 min.

In a preferred embodiment of the present invention the water is treated with a filtration, UV lamp and chlorination system to leave said water free from impurities.

The method according to the present invention also comprises the step of adding a quantity of calcium carbonate to the above mixture, stirring at 1300 rpm for a sufficient time to achieve complete dispersion, wherein the sufficient time to achieve this may be 15 min.

In a preferred embodiment of the method in question, the calcium carbonate has a purity of >99%.

In another method according to the present invention, the calcium carbonate is present in a quantity of no less than 65% relative to the total volume of the organic nutrient.

In one embodiment of the method according to the invention, the steps of mixing the humic substance and the calcium carbonate are carried out using a grinder-stirrer system.

The method in question also comprises the step of grinding the above mixture in a vertical pearl mill using a batch system for a sufficient time for the particles to have an average size of less than 1 micron, wherein the sufficient time may be about 6 h. In one embodiment of the method in question, the vertical pearl mill using a batch system has a pearl volume of 90% relative to the total free volume and rotates at a constant speed of 1000 rpm. In a further embodiment of the method according to the present invention, the particle size distribution is $dp_{50}$=0.75 microns to 0.70 microns.

A further step in the method of producing the organic nutrient according to the present invention is adjusting the percentage of solids to the initial value indicated in the nutrient formula by determining the volume, density and final percentage of solids of the dispersion produced in the previous step of said method.

Said method also comprises adding a quantity of hydroxiphyllosilicate of aluminum and magnesium (attapulgite), stirring at 1300 rpm for a sufficient time to achieve complete dispersion, said time being about 15 min., wherein the quantity of attapulgite (HPAM) is obtained by multiplying the total quantity of kilograms of calcium carbonate by the ratio kg HPAM/kg calcium carbonate of 0.0225, and the sufficient time to achieve complete dispersion of the attapulgite is 15 min on average.

In one embodiment of the method according to the present invention, the humic substance has a purity of at least 90% and is present in a quantity of 1% to 5% relative to the total volume of the organic nutrient.

In another preferred embodiment of the method according to the present invention, the humic substance is humic acids, fulvic acids and a combination thereof.

Finally, the method in question also comprises the step of recovering particles of less than 1 micron from the product obtained (nutrient). Accordingly the product is passed through a 325-mesh sieve to retain any particle with a size of more than 1 micron.

A further object of the present invention is a method of improving agricultural soils, characterized in that it comprises applying a sufficient quantity of the liquid organic nutrient according to the present invention, wherein in one embodiment of said method the sufficient quantity of the liquid organic nutrient is from 10 L of liquid organic nutrient per ha.

The present invention also comprises a method of feeding a living organism, characterized in that it comprises providing the living organism with a sufficient quantity of the liquid organic nutrient according to said invention, wherein in one embodiment of said method, the sufficient quantity of the liquid organic nutrient is from 5 L of liquid organic nutrient per ha. In a further embodiment of the method, the living organism is a plant.

EXAMPLES

The following examples are included solely to illustrate some embodiments of the present invention and therefore said examples should not be considered to limit the scope of protection of said invention.

Example 1. Components of Said Liquid Organic Nutrient for Agricultural Use a) water, used as a diluent;
b) calcium carbonate with a purity of 99%, an average particle size of 0.70 microns, present in a quantity of 65% relative to the total volume of the organic nutrient, and having a relative neutralizing power of 100%. Its function is to raise the soil pH and provide calcium (Ca) to the soil and to those living organisms that can feed on said organic nutrient, such as plants, etc.;
c) humic acids and fulvic acids with a purity of 90% in a quantity of 1.55%, where they perform the function of providing nutrients N-P-K (1-0-19); they are a natural crop biostimulant, improve the cation exchange capacity of the soil, increase the availability of nutrients to crops, stimulate root development and assist grinding within the process (dispersant); and
d) attapulgite (hydroxiphyllosilicate of aluminum and magnesium (HPAM)) with a high gelling capacity and a relative neutralizing power of 30% in a quantity of 0.35%, wherein its function is to act as a phase stabilizer and thickener.

In summary, the following technical advantages of the organic nutrient according to the present invention can be listed:

Calcium-carbonate-based organic nutrient.
Water-based suspension with a high concentration of solids.
Average calcium carbonate particle size of less than 1 micron.
High calcium carbonate purity (100% relative neutralizing power).
Calcium contribution coming mainly from the calcium carbonate.
Macro and micronutrient contribution from the humic substances.
Biostimulant effect on crops provided by the humic substances.

Example 2. Mode of Implementing the Production Method for the Liquid Organic Nutrient Described in Example 1, See FIG. 1

1. Find the tare weight of a previously washed 1000 L capacity formulation tank on a conventional industrial balance, where the weight of said tank is considered to be 0 Kg.
2. Add the quantity of water indicated in the nutrient formula, where the water was previously treated in a filtration system, an ultraviolet UV lamp and a chlorination system.
3. Transport the formulation tank with the water to a grinder-stirrer system and begin the dispersion process by turning on the stirrer that reaches a speed of 1300 revolutions per minute (rpm).
4. Manually add the total quantity of humic substances indicated in the organic nutrient formula intermittently, until incorporation, homogenization and humectation thereof are complete. The estimated homogenization time is 10 minutes at 1300 revolutions per minute (rpm).
5. With the stirring system turned on, add the quantity of calcium carbonate established in the product formula, leaving the ingredients to disperse for a minimum of 15 minutes at 1300 revolutions per minute (rpm). The calcium carbonate needed per lot of product is stored in a single raffia bag. Using a hoist, said bag is raised to the height of the hopper of the mill-stirrer system, the lower opening of the bag is opened and the calcium carbonate falls under the effect of gravity into the water-humic substances mixture.
6. Grind the above mixture in a vertical pearl mill using a batch system. Said mill has a pearl volume of 90% relative to the total free volume and rotates at a constant speed of about 1000 revolutions per minute (rpm). The batch system consists of transferring the 1000 L of dispersion from the initial tank to another tank, having previously passed through the mill by means of a fixed flow rate pump, so that once transferred, the entire dispersion is returned to the first tank, passing through the mill once again. This procedure is repeated until the dispersion reaches the specified average particle size distribution. The estimated milling time is about 6 hours.
7. When the average particle size distribution of $dp_{50}=0.75$ microns to 0.70 microns is reached, the volume, density and percentage of final solids of the dispersion are determined in order to adjust the percentage of solids to the initial value indicated in the product formula.
8. Having adjusted the percentage of solids, the quantity of hydroxiphyllosilicate of aluminum and magnesium (HPAM) to be included in the dispersion is calculated. This is obtained by multiplying the total quantity of kilograms of calcium carbonate by the ratio kg hydroxiphyllosilicate of aluminum and magnesium (HPAM)/ kg calcium carbonate of 0.0225.
9. The stirring system is turned on and the resulting quantity of hydroxiphyllosilicate of aluminum and magnesium (HPAM) is added manually and intermittently to the dispersion and left to disperse for at least 15 minutes.
10. Sieve the product by passing through a 325-mesh sieve to retain any particle with an average size greater than the typical opening size of said standard sieve. To do this, said product is transferred under the effect of gravity to another suitably washed 1000 L capacity tank.
11. Finally, once this has been done, the product can be stored until required and/or packed for presentation as required.

We claim:

1. An organic nutrient for agricultural use, consisting of:
   i) calcium carbonate consisting of particles having an average size of less than 1 micron and a relative neutralizing power of 100%;
   ii) at least one humic substance capable of releasing nitrogen, phosphorous and potassium having a N-P-K value of 1-0-19;
   iii) attapulgite (hydroxiphyllosilicate of aluminum and magnesium (HPAM)) with a gelling capacity and a relative neutralizing power of 30%;
   iv) water used as a diluent;
   v) wherein the particle size distribution of the calcium carbonate is $dp_{50}$=0.75 microns to 0.70 microns, the calcium carbonate has a purity of >99% and the calcium carbonate is present in a quantity of no less than 65% of the liquid organic nutrient;
   vi) wherein the attapulgite is in a quantity of 0.1% to 0.5% of the liquid organic nutrient;
   vii) wherein the humic substance has a purity of over 90% and is present in a quantity of approximately 1% to 5% of the liquid organic nutrient; and
   viii) wherein the organic nutrient is a liquid.

2. The nutrient according to claim 1, wherein the humic substance is selected from the group consisting of humic acids, fulvic acids and a combination thereof.

3. The nutrient according to claim 1, wherein the water is first treated with a filtration system, an ultraviolet (UV) lamp and chlorination system.

4. A method for producing the liquid organic nutrient for agricultural use according to claim 1, wherein said method comprises the steps of:
   i) mixing at least one humic substance, according to claim 1, with water and stirring at 1300 revolutions per minute (rpm) for a sufficient amount of time to achieve complete incorporation, homogenization and humectation;
   ii) adding calcium carbonate to the mixture resulting from step i) and stirring at 1300 revolutions per minute (rpm) for a sufficient time to achieve complete dispersion;
   iii) grinding the mixture resulting from step ii) in a vertical pearl mill using a batch system for a sufficient amount of time to completely grind the mixture until the particles have an average particle size of less than 1 micron;
   iv) adjusting the percentage of solids in the mixture resulting from step iii) to an initial value indicated in a nutrient formula, by determining the volume, density and final percentage of solids of the dispersion obtained in step iii);
   v) adding hydroxiphyllosilicate of aluminum and magnesium (attapulgite) and stirring at 1300 revolutions per minute (rpm) to achieve complete dispersion;
   vi) recovering the particles of less than 1 micron from the product of step v by passing the product of step v through a 325-mesh sieve to retain any particle with a size greater than 1 micron; and
   vii) recovering the liquid organic material.

5. The method according to claim 4, wherein steps i) and ii) are carried out using a grinder-stirrer system.

6. The method according to claim 4, wherein the vertical pearl mill has a 90% volume of pearls relative to the total free volume and rotates at a constant speed of 1000 revolutions per minute (rpm).

7. The method according to claim 4, wherein the particle size distribution of step iii) is $dp_{50}$=0.75 to 0.70 microns.

8. The method according to claim 4, wherein the calcium carbonate has a purity of >99% and is present in a quantity of no less than 65% of the liquid organic nutrient.

9. The method according to claim 4, wherein the humic substance has a purity of over 90% and is present in a quantity of 1% to 5% of the liquid organic nutrient.

10. The method according to claim 4, wherein the humic substance is selected from the group consisting of humic acids, fulvic acids and a combination thereof.

11. The method according to claim 4, wherein the water is treated with a filtration system, an ultraviolet (UV) lamp and a chlorination system.

12. The method according to claim 4, wherein the sufficient amount of mixing time of step i) is 10 minutes, the sufficient amount of time to achieve the complete dispersion of the calcium carbonate is 15 minutes, the sufficient amount of grinding time of step iii) until the particles have an average particle size of less than 1 micron is 6 hours and the sufficient amount of stirring time to achieve complete dispersion of the attapulgite is 15 minutes.

13. The method according to claim 4, wherein the quantity of attapulgite is obtained by multiplying the total amount of calcium carbonate, in kilograms, by the ratio of HPAM/kg to calcium carbonate of 0.0225.

14. A method to improve agricultural soils, comprising the steps of:
   applying the liquid organic nutrient according to claim 1 to the soil.

15. The method according to claim 14, wherein the quantity of the liquid organic nutrient is 10 L of liquid organic nutrient per hectare.

* * * * *